United States Patent
Hanson et al.

(10) Patent No.: US 7,079,119 B2
(45) Date of Patent: Jul. 18, 2006

(54) COVER FOR ELECTRONIC DEVICE

(75) Inventors: William R. Hanson, Mountain View, CA (US); Shawn R. Gettemy, San Jose, CA (US); Yoon Kean Wong, Redwood City, CA (US)

(73) Assignee: Palm, Inc., Santa Clara, CA (US)

( * ) Notice: Subject to any disclaimer, the term of this patent is extended or adjusted under 35 U.S.C. 154(b) by 364 days.

(21) Appl. No.: 10/085,326

(22) Filed: Feb. 28, 2002

(65) Prior Publication Data

US 2003/0160754 A1    Aug. 28, 2003

(51) Int. Cl.
*G09G 5/00*  (2006.01)
(52) U.S. Cl. ..................... 345/175; 345/173
(58) Field of Classification Search ........... 345/173, 345/156, 175
See application file for complete search history.

(56) References Cited

U.S. PATENT DOCUMENTS

| | | | |
|---|---|---|---|
| 5,216,411 A * | 6/1993 | Ashitomi et al. ............ 345/168 |
| 6,046,730 A * | 4/2000 | Bowen et al. ............... 345/168 |
| 6,219,681 B1 | 4/2001 | Hawkins et al. |
| 6,259,597 B1 * | 7/2001 | Anzai et al. ................. 345/169 |
| 6,555,235 B1 * | 4/2003 | Aufderheide et al. ....... 428/447 |
| 6,567,137 B1 * | 5/2003 | Moon .......................... 349/61 |
| 6,643,124 B1 * | 11/2003 | Wilk ........................... 345/169 |
| 6,662,244 B1 * | 12/2003 | Takahashi .................... 710/14 |
| 2001/0012769 A1 * | 8/2001 | Sirola et al. ................. 455/90 |
| 2002/0042291 A1 * | 4/2002 | Lahteenmaki et al. ....... 455/566 |
| 2002/0084992 A1 * | 7/2002 | Agnew ........................ 345/173 |
| 2003/0071832 A1 * | 4/2003 | Branson ...................... 345/698 |
| 2003/0095399 A1 * | 5/2003 | Grenda et al. ................ 362/30 |
| 2004/0022050 A1 * | 2/2004 | Yamashita et al. ........... 362/31 |

OTHER PUBLICATIONS

Technology Review, "Electronic Paper Turns the Page," available at htt://www.technologyreview.com/magazine/mar01/mann.asp (printed Nov. 6, 2001 and bearing a designation of "Mar. 2001"), 10 pages.

Technology Review, "Little Big Screen," available at http://www.techreview.com/magazine/jun01/sherman.asp (printed Nov. 6, 2001 and bearing a designation of "Jun. 2001"), 7 pages.

ZDNet, "E-Paper Here Sooner Than You Think," available at http://zdnet.com/anchordesk/stories/story/0,10738,2656348,00.htm (printed Nov. 6, 2001 and bearing a designation of "Nov. 21, 2000"), 4 pages.

ZDNet, "The future of electronic paper," available at http://www.zdnet.com/zdnn/stories/comment/0,5859,2717791,00.htm (printed Nov. 6, 2001 and bearing a designation of "May 11, 2001"), 3 pages.

(Continued)

*Primary Examiner*—Ricardo Osorio
(74) *Attorney, Agent, or Firm*—Foley & Lardner LLP (57) ABSTRACT

An electronic device such as a personal digital assistant (PDA) is disclosed. The electronic device includes a cover coupled to a computing device. The cover may include at least one of a touch panel and a lighting system.

27 Claims, 4 Drawing Sheets

OTHER PUBLICATIONS

BBC News, "E-paper moves a step nearer," available at http://news.bbc.co.uk/hi/english/sci/tech/newsid_129200/1292852.stm (printed Nov. 6, 2001 and bearing a designation of "Apr. 23, 2001"), 3 pages.

InfoWorld, "Electronic paper gets its bearing," available at http://www.infoworld.com/articles/hn/xml/01/04/16/010416hnetrend.xml/?template=/storypages/ctozone_story.html (Printed Nov. 6, 2001 and bearing a designation of "Apr. 13, 2001,"), 4 pages.

EETimes.com, "electronic paper writes new chapter for displays," available at http://www.eetimes.com/story/technology/OEG20001130S0011 (printed Nov. 6, 2001 and bearing the designation of "Nov. 30, 2000"), 3 pages.

E INK, Various Internet web page screen shots; available at http://www.eink.com (printed Nov. 6, 2001), 14 pages.

SearchWebManagement.com, "e-paper," available at http://searchwebmanagement.techtarget.com/sDefinition/0,,sid27_gci535038,00.html (printed Nov. 6, 2001), 2 pages.

* cited by examiner

COVER FOR ELECTRONIC DEVICE

BACKGROUND

The present invention relates generally to the field of electronic devices. More specifically, the present invention relates to cover assemblies for use with portable electronic computing devices.

Portable electronic devices generally allow users to perform a number of functions in an electronic medium. These devices may include programs or applications for personal information management, voice memo recording, wireless telephony and e-mail, and word processing. Database, spreadsheet, graphics, presentation, and other electronic applications may also be provided. One example of a portable electronic device is a hand held computing device, sometimes referred to as a personal digital assistant (PDA), palmtop, or palmheld. Other examples of portable electronic devices include laptop computers, pagers, and mobile or cellular telephones.

Portable electronic devices may include a display for presenting information to a user of the device. For example, the display may be a liquid crystal display (LCD). The portable electronic device may also include a lighting system and/or a touch panel overlaid on the display. The lighting system may provide a light source for the display, while the touch panel may allow a user to input information into the electronic device or to select or manipulate items presented on the display.

Portable electronic devices may also include a cover panel or cover that protects or shields the display from damage. For example, a cover made of a rigid plastic may protect the display if the portable electronic device is dropped. Such a cover reduces the risk that fragile display components, such as glass included in the display, will be damaged or destroyed.

One difficulty with this arrangement is that it may be difficult and/or expensive to upgrade components of the portable electronic device. For example, a user may desire a brighter or more powerful lighting system. There may be no simple or convenient way to upgrade or replace the lighting system, since it is coupled to the display. A related difficulty concerns upgrading or replacing the display (e.g., replacing a monochrome display with a color display, replacing a lower-resolution display with a higher-resolution display, etc.). Because the touch panel and lighting system are coupled to the display, replacing the display may also require replacing the touch panel and lighting system, even where the touch panel and lighting system are functioning properly.

Another difficulty is that if one of the components (e.g., lighting system, touch panel, or display) is damaged or broken, others may also be damaged due to their proximity to the broken component. Similarly, if one of the components is damaged or broken, use of the other components may be impaired. For example, if a portion of the touch panel is damaged, the display underlying the damaged portion may not be visible to a user.

There is thus a need for a portable electronic device that allows convenient and inexpensive replacement of components. There is also a need for a portable electronic device that allows a user to view the entirety of the display even where a touch panel is damaged. There is further a need for a portable electronic device that includes a touch panel and/or lighting system that is not coupled to the display.

It would be desirable to provide an electronic device that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to an electronic device. The electronic device includes a cover coupled to a computing device and a display coupled to the computing device and separate from the cover. The cover includes at least one of a touch panel and a lighting system.

Another exemplary embodiment relates to a cover for a portable electronic device. The cover includes a frame and a touch panel coupled to the frame. The cover also includes a lighting system coupled to the frame and configured to illuminate a display when the cover is positioned proximate to the display.

A further exemplary embodiment relates to portable electronic device. The portable electronic device includes a computing device having a housing and a display fixably attached to the housing. A cover panel including a frame is also included. The cover panel is rotatably coupled to the housing and movable between a first position and a second position. A lighting assembly and a touch panel are coupled to the frame. The lighting assembly and touch panel are located proximate at least a portion of the display in the second position.

A further exemplary embodiment relates to a method for using a portable electronic device. The method includes positioning a cover adjacent to at least a portion of a display attached to a computing device. The cover includes a touch panel and a lighting assembly. The method also includes illuminating a portion of the display and entering information into the computing device using the touch panel.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED AND EXEMPLARY EMBODIMENTS

Figure 1:
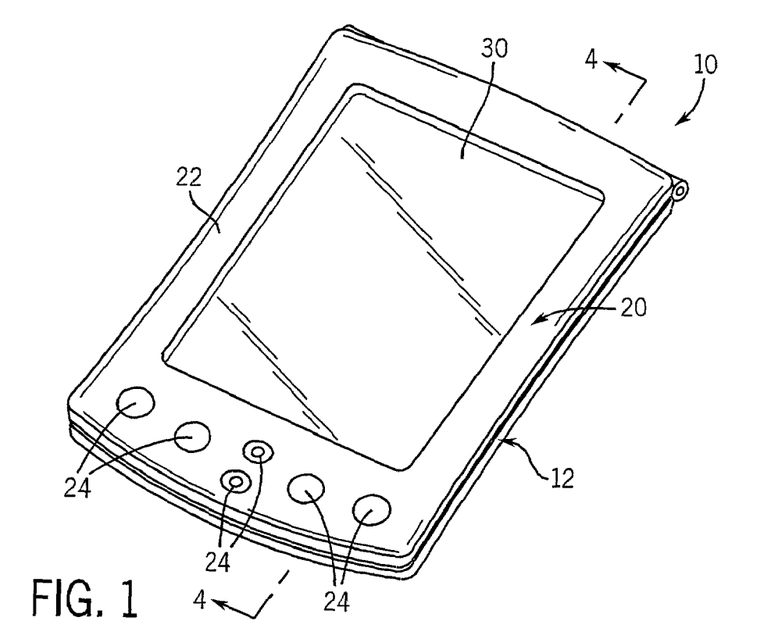
FIG. 1 is a perspective view of an electronic device according to an exemplary embodiment with a cover arranged in a closed position.

Referring to FIG. 1, a portable electronic device 10 is shown as a personal digital assistant (PDA) according to an exemplary embodiment. Electronic device 10 may be any of a variety of electronic devices, including a personal digital assistant, a cellular or mobile phone, a pager, a laptop computer, and the like. In a preferred embodiment, electronic device 10 may be a Palm® computing device manufactured by Palm, Inc., of Santa Clara, Calif.

Electronic device 10 may be used to perform any of a variety of functions, such as maintaining calendars, appointment lists, phone lists, and task lists. Various software applications and programs may be included in electronic device 10, including spreadsheet, text editing, database tools, audio and video editing and playback programs, games, and the like. Electronic device 10 may be configured for such functions as voice memo recording and playback as well as communications network connectivity, Internet connectivity, wireless messaging, e-mail, always-on e-mail, wireless telephony, and mobile telephone communications. Wireless functionality may be accomplished using an infrared or radio frequency transmitter and/or receiver.

Electronic device 10 includes a computing device 12 and a cover panel or cover 20. Computing device 12 includes a housing or case 13 within which are provided various components of computing device 12. Housing 13 may be made of any of a variety of materials, including polymeric materials (e.g., polypropylene, polyethylene, etc.), metals (e.g., aluminum, magnesium, etc.), metal alloys, and the like. At least one battery 44 and a printed circuit board (PCB) or circuit board 42 are contained within housing 13. Battery 44 provides power for computing device 12, and in an exemplary embodiment is a rechargeable battery. Circuit board 42 includes a processor (not shown) for performing calculations or other operations associated with applications and programs included in computing device 12.

A plurality of buttons 16 are coupled to or provided in housing 13 for moving a pointing device or cursor or performing any of a variety of other functions using computing device 12. For example, one or more of buttons 16 may be used to scroll through or to select text displayed to a user of computing device 12. Buttons 16 may be programmed to provide a variety of functions, and may be programmed to provide different functionality depending on the software being used.

Cover 20 may also include a plurality of buttons 24 such that when cover 20 is in a closed position (e.g., is positioned over computing device 12), buttons 24 engage buttons 16. Buttons 24 may be configured such that depressing one or more of buttons 24 act to depress a corresponding button 16 located directly beneath the relevant button. Thus, each of buttons 24 may include a projection or similar structure that forces a corresponding button 16 inward when one of buttons 24 is depressed. Alternatively, each of buttons 24 may instead be coupled to circuit board 42, such that no interaction is required between buttons 24 and buttons 16. In another alternative embodiment, no buttons are provided in the cover. In yet another alternative embodiment, apertures or holes are formed in the cover such that buttons coupled to or provided in the computing device may be actuated or depressed when the cover is positioned over the computing device. In this embodiment, the computing device buttons may protrude through apertures provided in the cover or may be positioned such that a user will use a pointing device such as a pen or the like to depress the buttons through the apertures.

A display 18 may present or display information to a user of electronic device 10. For example, a graphical user interface (GUI) may be presented on display 18, and may include various features configured to allow manipulation or control of various items displayed (e.g., a pointing device, cursor, etc.). In an exemplary embodiment, display 18 is a reflective display (i.e., light incident upon the display is used to display information). For example, display 18 may be a liquid crystal display (LCD). In an alternative embodiment, the display may be transflective (i.e., the display uses some combination of incident and emissive light to display information). In yet another alternative embodiment, the display may be backlit or emissive (i.e., all light used to display information comes from within or behind the display). For example, the display may be a plasma display. In another example, rigid or flexible OLED or PolyLED emissive displays may be used.

Figure 4:
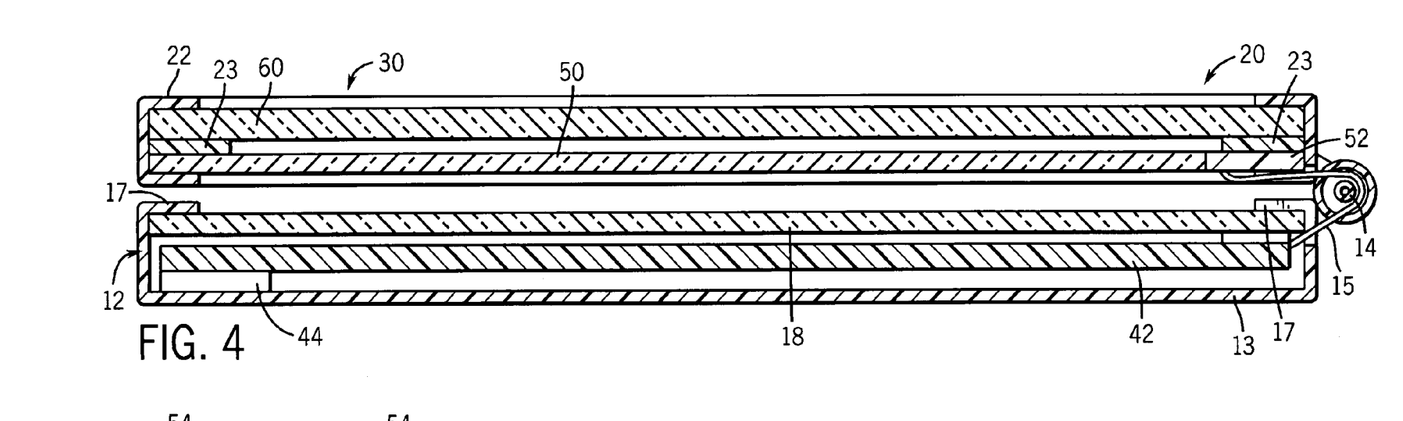
FIG. 4 is a cross-sectional view of the electronic device taken along the line 4—4 in FIG. 1.

As best shown in FIG. 4, display 18 may be provided in computing device 10 such that a portion 17 of housing 13 is disposed over the perimeter or edges of display 18. Thus, display 18 is fixably attached to housing 13 and is separate from cover 20. The top surface of display 18 is thus below the plane formed by the top surface of housing 13. In this manner, portion 17 may act as a frame or border that secures display 18 in place. In an exemplary embodiment, display 18 includes at least one glass layer. In an alternative embodiment, the glass layer may be replaced by a polymeric or plastic layer.

Other types of displays may also be used in place of or in addition to displays of the type described above. For example, a flexible or foldable display may be used, such as "electronic paper" type displays (e.g., e-Ink, Smart Paper™ by Gyricon Media, or APDυ by Citala, etc.). Flexible displays advantageously provide a large form factor (i.e., display size) display that may be expanded or collapsed as needed. An additional advantageous feature of such electronic paper displays is that once an image is created on the display, little or no electrical power is required to sustain the image on the display, such that the image remains displayed until another electrical signal acts to change the image.

Figure 3A:
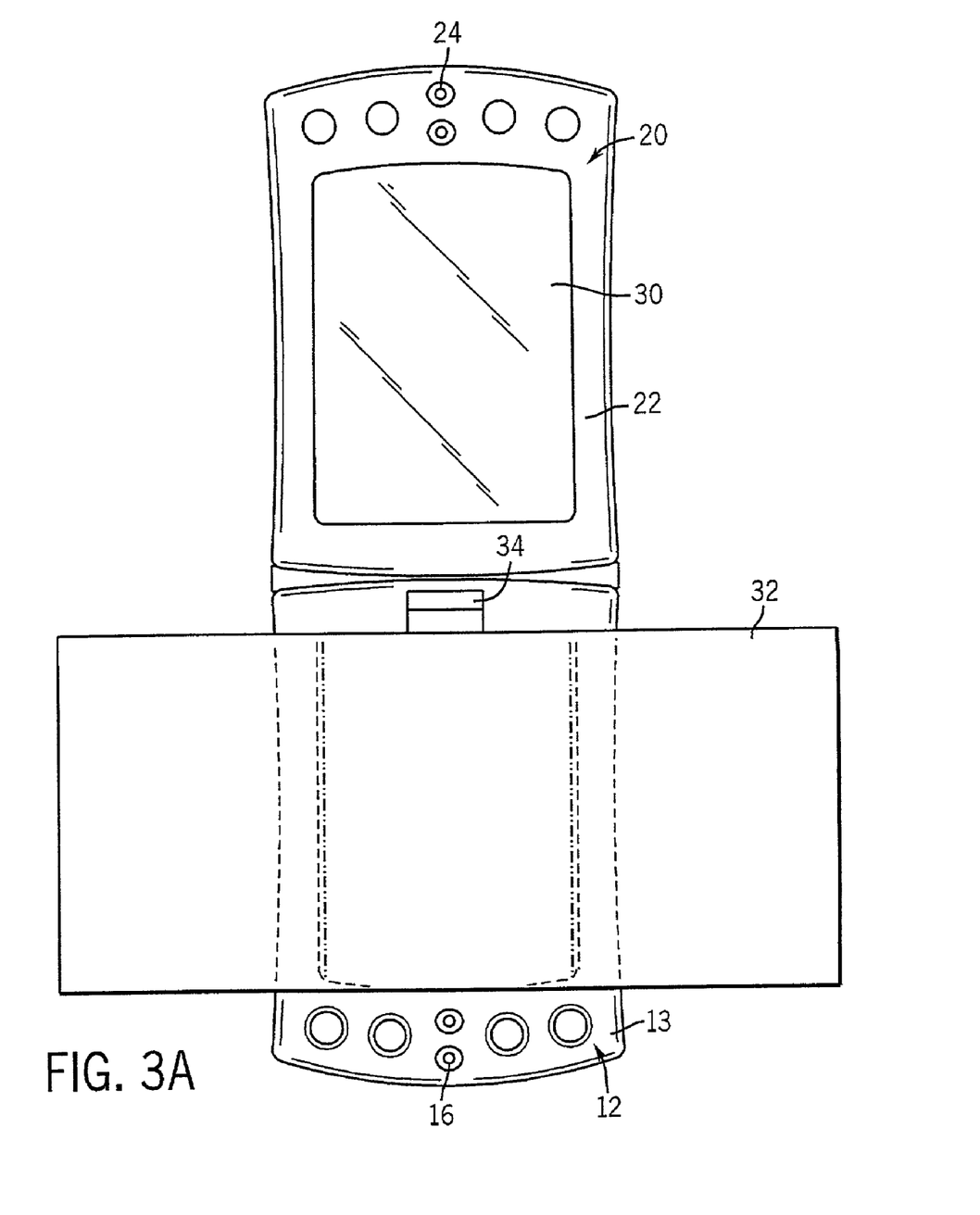
FIG. 3A is a top elevational view of the electronic device according to an alternative embodiment with the cover arranged in an open position and with a foldable display arranged in a first expanded position.
Figure 3B:
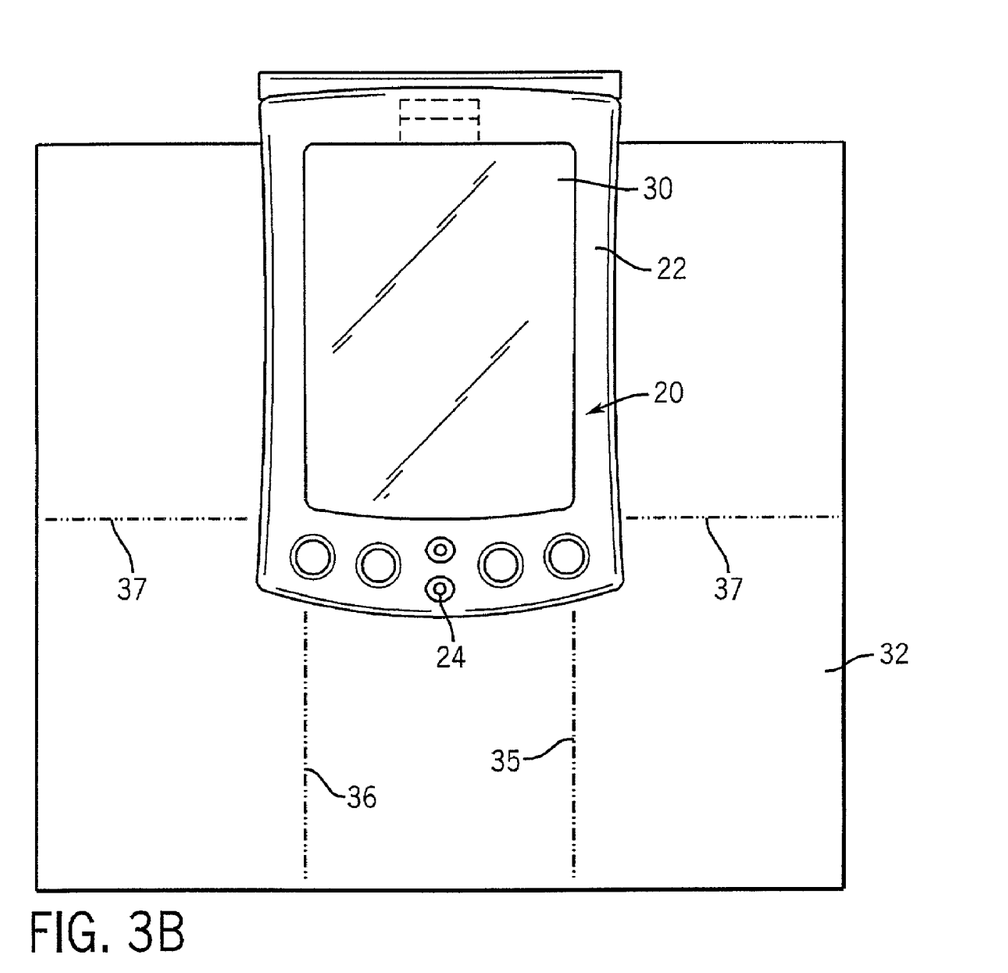
FIG. 3B is a top elevational view of the electronic device according to an alternative embodiment with the cover arranged in a closed position and with a foldable display arranged in a second expanded position.

An alternative embodiment showing the use of a flexible display is shown in FIGS. 3A and 3B. A flexible display 32 is shown in FIG. 3A in a first expanded position (e.g., partially unfolded), and in FIG. 3B in a second expanded position (e.g., fully unfolded). An electrical connector 34 provides an electrical connection between flexible display 32 and circuit board 42, and also acts to couple flexible display 32 to computing device 12. The location of electrical connector 34 may differ in other embodiments. For example, while electrical connector 34 is shown as being located near the center of the top of the computing device, it may be near the bottom of the computing device or on the sides of the computing device.

As shown in FIGS. 3A and 3B, flexible display 32 includes three fold lines or pivot points 35, 36, and 37. Fold lines 35, 36, and 37 divide flexible display 32 into six generally rectangular display sections or portions. From the fully expanded position shown in FIG. 3B, flexible display 32 may be folded along fold line 37, which results in the partially expanded position shown in FIG. 3A. Flexible display 32 may then be folded along fold lines 35 and 36 to a fully collapsed or folded position where only one generally rectangular display section is visible. In the fully collapsed or folded position, flexible display 32 may have a form factor similar or identical to that of the display shown in FIGS. 1–2. Thus, in a fully collapsed position, flexible display 32 may fit in a space similar to that occupied by display 18. To unfold flexible display 32, the same steps may be followed in reverse order. In alternative embodiments, a greater or lesser number of fold lines and/or display sections may be provided in a flexible display. Further, the size and shape of the flexible display may differ in alternative embodiments. For example, while flexible display 32 is shown as having a generally rectangular overall shape, a flexible display may be provided that has any of a variety of shapes, such as square, circular, elliptical, and the like.

One or both sides or surfaces of flexible display 32 may display images and the like. In an exemplary embodiment, one side of the flexible display may display images. In this embodiment, the flexible display may include a single display sheet that may display an image on one surface. In an alternative embodiment, both sides of flexible display 32 may display images. In this embodiment, images may be displayed when the display is in a fully expanded position, in a fully collapsed position, and in positions between fully expanded and fully collapsed positions. Thus, regardless of which portion of the display is facing the viewer of the display, images may be presented to the viewer. One method of accomplishing this result involves a flexible display having two flexible display panels or sheets proximate each other (e.g., fastened or adhered to each other about their perimeters, etc.). Another method involves a single sheet that may display images on either surface of the sheet.

Figure 2:
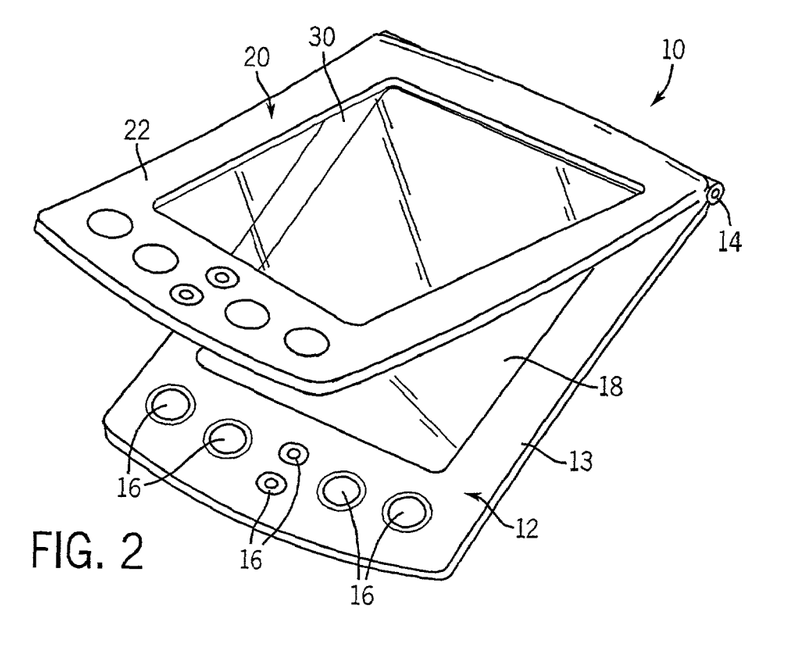
FIG. 2 is a perspective view of the electronic device shown in FIG. 1 with the cover arranged in a partially open position.

A flip cover or cover 20 is coupled or attached to housing 13. In an exemplary embodiment, cover 20 is rotatably coupled to housing 13 using one or more connectors or hinges 14. Cover 20 rotates about hinges 14 to allow positioning of cover 20 between a closed position (as shown in FIG. 1 in which cover 20 is positioned adjacent or proximate to display 18) and open positions (as shown in FIGS. 2 and 3A). Hinges 14 may be configured to allow cover 20 to rotate fully about hinges 14 such that cover 20 may be positioned behind computing device 12. As shown in FIG. 2, hinges 14 are mechanical hinges. In alternative embodiments, a living hinge or other connector may be employed. While hinges 14 are illustrated as being arranged along the top of the computing device, hinges may be arranged along the sides or bottom of the computing device in alternative embodiments. In another alternative embodiment, no connectors are used, and the cover may be removably attached to the computing device. In this embodiment, a wire may connect the cover to the computing device to provide power to the components included in the cover, as will be described below.

Cover 20 includes a frame or border 22 and a viewing element or window 30. In an exemplary embodiment, viewing element 30 is substantially transparent, such that when cover 20 is rotated into a closed position (i.e., positioned adjacent or proximate to display 18), information presented on display 18 will be visible through viewing element 30. Viewing element 30 is coupled to frame 22 along at least a portion of the perimeter or edge of viewing element 30. Frame 22 may be formed from an opaque, translucent, or transparent material, and may be the same as or may differ from the material used for housing 13. In an exemplary embodiment, frame 22 is an opaque rigid polymeric material. In an alternative embodiment, the frame may be made of an elastomeric material, leather, or other suitable flexible material. Frame 22 may act to conceal the edges of viewing element 30 and to provide a rigid structure to which viewing element 30 may be coupled or attached. In an alternative embodiment, the cover does not include a frame portion, such that the edges of viewing element are visible to a user of electronic device 10.

As shown in FIG. 4, viewing element 30 may comprise one or more components or elements. In an exemplary embodiment, viewing element 30 comprises a lighting system or assembly 50 and a touch panel or sensor 60. An adhesive or transparent tape may act to couple lighting assembly 50 to touch panel 60 about a perimeter of lighting assembly 50 and touch panel 60.

In alternative embodiments, viewing element 30 may include only one of a lighting system and a touch panel. In other alternative embodiments, viewing element 30 may include a lighting system and/or a touch panel in addition to other components, such as polarizers, optical films, or other components. The arrangement of the various viewing element components may vary depending on any of a variety of factors. As shown in FIG. 4, touch panel 60 is arranged above lighting system 50 such that a user may contact touch panel 60 directly when cover 20 is positioned in the closed (e.g., use) position.

Spacers 23 are provided intermediate touch panel 60 and lighting assembly 50. In an alternative embodiment, spacers are not included, and the touch panel and lighting system are in direct contact. One or more wires or electronic connectors 15 are connected at a first end to one or both of touch panel 60 and lighting assembly 50 and at a second end to circuit board 42. Wire 15 may be attached to, included in, or integrally formed with hinge 14. One advantageous feature of incorporating wire 15 in hinge 14 is that exposure of wire 15 may be minimized, such that the chance for damage to wire 15 may be reduced.

In an exemplary embodiment, one or more wires having an applied voltage may be coupled to the light sources, and one or more additional wires may be coupled to the touch panel. The wires coupled to the touch panel may transmit signals to an analog-to-digital converter (ADC) that converts an analog signal to a digital representation of that signal. In an alternative embodiment, the touch panel may be coupled to a radio transmitter that transmits signals from the cover to the computing device. For example, the signals may be transmitted to a receiver in the computing device, which in turn communicates the signals to the circuit board. The circuit board may then use information included in the signal in the same manner as with signals received over wire 15.

Figure 5:
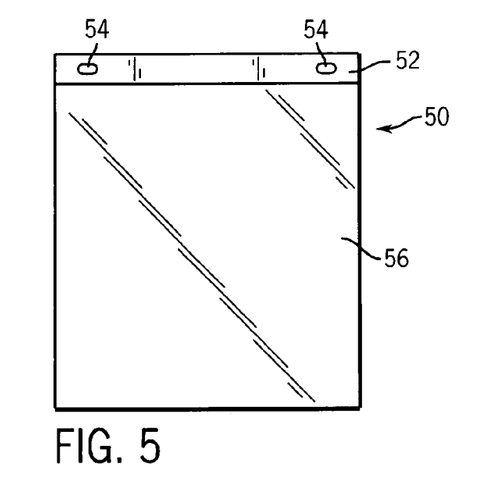
FIG. 5 is a top plan view of a lighting assembly included in the electronic device shown in FIG. 1.

As shown in FIGS. 4–5, lighting assembly 50 includes a light bar 52 coupled or attached to a light guide 56. One or more light sources 54, such as one or more light emitting diodes (LEDs), are coupled to or included in light bar 52. Light from light sources 54 shines into light bar 52, which in turn directs the light to light guide 56. Light guide 56 acts to provide a substantially uniform light field which may be directed away from the surface of light guide 56. When cover 20 is in the closed position, light guide 56 directs light toward display 18 to illuminate display 18. In this manner, lighting assembly 50 may be used as a front light in combination with a reflective or transflective display. Light guide 56 may have a thickness of between approximately 0.5 and 1.5 millimeters.

Light guide 56 may be made from polymethyl methacrylate (acrylic), polycarbonate, or other materials suitable for use as light guides, and may include microstructures or prisms that direct light away from the surface of the light guide. In an exemplary embodiment, the microstructures are arranged toward the top surface of light guide 56. In this embodiment, a space is provided between light guide 56 and touch panel 60 to prevent damage to the microstructures. In an alternative embodiment, the microstructures may be arranged toward a bottom surface of the light guide. In this embodiment, the light guide and touch panel may be positioned directly adjacent or in contact with each other.

One advantageous feature of providing a front light in a flip cover is that the front light may be used in conjunction with a reflective or transflective flexible display. For example, as shown in FIG. 3B, after flexible display 32 is expanded, cover 20 may be positioned over or proximate to at least a portion of flexible display 32. In this manner, the front light incorporated in cover 20 may act to illuminate at least a portion of flexible display 32. Because light guide 56 directs light away from cover 20, the light will be directed toward a surface of flexible display 32 such that images presented on flexible display 32 will be illuminated. Although FIG. 3B shows a top middle portion of flexible display 32 overlaid with cover 20, in alternative embodiments other portions of a flexible display may be illuminated. For example, where a flexible display is connected to a computing device in a manner that allows the flexible display to be moved in relation to a computing device, any of a variety of portions of the flexible display may be illuminated by a front light included in the cover. One example of such a system involves the connection of a flexible display to an electronic device by a flexible wire or cable (e.g., a wire similar to a phone cord). The flexible display may then be positioned away from the computing device or a portion of the flexible display may be positioned proximate to the computing device. Portions of the flexible display located proximate the computing device may then be overlaid with the cover and light guide such that the portion of the flexible display is illuminated by the front light.

Figure 6:
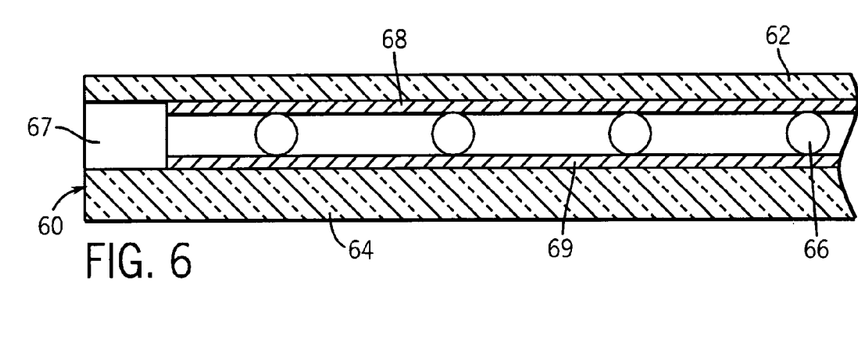
FIG. 6 is a cross-sectional view of a touch panel included in the electronic device shown in FIG. 1.

As shown in FIG. 6, touch panel 60 is an analog resistive type touch panel. Touch panel 60 includes a first film or sheet 62 and a second film or sheet 64. First sheet 62 may be made of mylar or another comparable material (e.g., polyethylene terephthalate (PET)). Second sheet 64 may be made of PET, plastic, glass, PET laminated to plastic, or PET laminated to glass. First sheet 62 and second sheet 64 include conductive layers 68, 69, respectively. In an exemplary embodiment, conductive layers 68, 69 are made of indium tin oxide (ITO) or another substantially transparent conductive material. Spacers 66 are provided intermediate first sheet 62 and second sheet 64 to provide spacing between first and second sheets 62, 64. A perimeter area 67 may contain electrodes, insulators, and a seal which couples first sheet 62 to second sheet 64. In an exemplary embodiment, touch panel 60 may have a thickness of approximately 0.5–1.5 mm.

In operation, information may be entered in computing device 12 by a user of touch panel 60. A writing or pointing device such as, but not limited to, a pen, stylus, or fingertip, contacts first sheet 62 and forces first sheet 62 toward second sheet 64. When conductive layers 68, 69 make contact, a circuit is completed at the point of contact. The circuit completion is recognized by the computing device and may be used for any of a number of functions. For example, touch panel 60 may allow a user to write text messages, draw images, and/or select or manipulate items presented on display 18. Touch panel 60 may be used in conjunction with Graffiti™ or other handwriting recognition software.

In an alternative embodiment, a touch panel provided in a flip cover may be used in conjunction with a flexible display provided in an electronic device. For example, the flip cover and touch panel may be positioned over or proximate to at least a portion of the flexible display. The touch panel may then be used to write, draw, or manipulate items in the portion of the display over which the touch panel is positioned, or may be used to write, draw, or manipulate items that are presented elsewhere in the flexible display (i.e., in areas of the flexible display over which the touch panel is not positioned). In another example, the flexible display may be positioned away from the computing device, as where a flexible wire or cable is provided to connect the flexible display to the computing device. In this example, the touch panel may be used to write, draw, or manipulate items displayed on the flexible display. The touch panel may then be used as a type of writing or drawing tablet which translates the writing, drawing, or manipulation of items to the flexible display.

The position and arrangement of parts may differ in alternative embodiments. While a flip cover has been shown as including both a touch panel and a lighting system, separate covers may be provided, one of which includes a touch panel and the other of which includes a lighting system. In another embodiment, a first flip cover may include a touch panel and a lighting system, and a second flip cover may be provided as a protective cover (e.g., made of rigid polymeric material, metal, or another suitable material) that may be positioned over the first flip cover when the first flip cover is not in use. Alternatively, the second flip cover may include a display. In yet another embodiment, both a flexible display and a non-flexible display (such as that shown in FIGS. 1–2) may be provided in a computing device. For example, a flexible display may be coupled to the computing device by a flexible cable or wire that allows the flexible display to be positioned away from the computing device. Both the flexible and non-flexible display may then be used to display images or perform other functions.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A cover for a portable electronic device comprising:

a frame;

a touch panel coupled to the frame; and a lighting system coupled to the frame and configured to illuminate a display which is separate from the cover when the cover is positioned to overlay the display, wherein the frame may be moved from a first position in which the touch panel overlays the display and the touch panel is useable, to a second position in which the touch panel does not overlay the display, and the cover does not comprise the display.

2. The cover of claim 1, wherein the cover is coupled to a computing device housing.

3. The cover of claim 1, wherein the display is coupled to a computing device.

4. The cover of claim 1, wherein the display is a flexible display.

5. The cover of claim 4, wherein the flexible display comprises at least one fold line dividing the flexible display into at least two display sections.

6. The cover of claim 1, wherein the lighting system comprises a light guide and a light source.

7. The cover of claim 6, wherein the light source comprises at least one light emitting diode.

8. The cover of claim 6, wherein the portable electronic device includes a display and the light guide is configured to direct light toward the display when the cover is positioned proximate the display.

9. The cover of claim 1, wherein the touch panel is an analog resistive touch panel comprising a first sheet and a second sheet.

10. The cover of claim 9, wherein at least one of the first and second sheets include a conductive coating.

11. The cover of claim 10, wherein the conductive coating comprises indium tin oxide.

12. A portable electronic device comprising:
a computing device having a housing and a display fixably attached to the housing;
a cover panel having a frame and rotatably coupled to the housing and movable between a first position and a second position;
a lighting assembly coupled to the frame; and
a touch panel coupled to the frame and separate from the lighting assembly;
wherein the lighting assembly and touch panel are located proximate at least a portion of the display in the second position and the cover does not comprise the display, the lighting assembly comprises a light guide and at least one light emitting diode, and the light guide is configured to direct light toward at least a portion of the display when the cover panel is positioned to overlay the display.

13. The portable electronic device of claim 12, wherein the display panel is at least one of a reflective, a transflective, and an emissive display.

14. The portable electronic device of claim 12, wherein the display panel is a foldable display tat is movable between a collapsed and an expanded position.

15. The portable electronic device of claim 12, wherein the cover panel is coupled to the computing device by at least one hinge.

16. The portable electronic device of claim 12, further comprising means for providing a electrical connection between the computing device and at least one of the lighting assembly and the touch panel.

17. The portable electronic device of claim 12, wherein the touch panel is an analog resistive touch panel.

18. The portable electronic device of claim 12, wherein the touch panel comprises a first layer and a second layer, wherein the first and second layers include a conductive coating.

19. The portable electronic device of claim 18, wherein the conductive coating comprises indium tin oxide.

20. A method for using a portable electronic device comprising:
positioning a cover to overlay at least a portion of a display attached to a computing device, the cover comprising a touch panel and a lighting assembly;
illuminating at least a portion of the display when the cover is positioned to overlay at least the portion of the display; and
entering information into the computing device using the touch panel,
wherein the cover does not include the display and the cover may be moved out of the way of the display.

21. The method of claim 20, wherein the display is a flexible display.

22. The method of claim 21, wherein the flexible display is configured to provide a large form factor display.

23. The method of claim 21, further comprising expanding the flexible display.

24. The method of claim 20, wherein the step of positioning the cover comprises rotating the cover about a hinge coupling the cover to the computing device.

25. The method of claim 20, wherein the lighting assembly comprises a light guide and a light source.

26. The method of claim 20, wherein the step of entering information into the computing device comprises at least one of writing and drawing.

27. The method of claim 20, wherein the step of entering information into the computing device comprises contacting the touch panel using at least one of a pen, a stylus, and a fingertip.

* * * * *